(12) United States Patent
Upadhyay (10) Patent No.: US 12,010,234 B2
(45) Date of Patent: *Jun. 11, 2024

(54) SYSTEM AND METHOD TO GENERATE A UNIQUE SECURITY PROOF FOR SECURE ACCESSING OF DATA

(71) Applicant: Gaurav Upadhyay, Hyderabad (IN)

(72) Inventor: Gaurav Upadhyay, Hyderabad (IN)

(73) Assignee: Gaurav Upadhyay (IN)

( * ) Notice: Subject to any disclaimer, the term of this patent is extended or adjusted under 35 U.S.C. 154(b) by 140 days.

This patent is subject to a terminal disclaimer.

(21) Appl. No.: 17/178,289

(22) Filed: Feb. 18, 2021

(65) Prior Publication Data
US 2021/0344491 A1 Nov. 4, 2021

(30) Foreign Application Priority Data
May 4, 2020 (IN) .............................. 202041018975

(51) Int. Cl.
*H04L 9/32* (2006.01)
*G06V 20/30* (2022.01)
*H04L 9/08* (2006.01)

(52) U.S. Cl.
CPC ............ *H04L 9/3218* (2013.01); *G06V 20/30* (2022.01); *H04L 9/0825* (2013.01); *H04L 9/0894* (2013.01)

(58) Field of Classification Search
CPC ... H04L 9/3218; H04L 9/0825; H04L 9/0894; G06V 20/30

USPC ......................................................... 713/168
See application file for complete search history.

(56) References Cited

U.S. PATENT DOCUMENTS

| 10,841,483 B1* | 11/2020 | Hunt | G06T 3/0068 |
|---|---|---|---|
| 2016/0140553 A1* | 5/2016 | Faith | G06Q 30/06 705/44 |
| 2018/0303702 A1* | 10/2018 | Novich | G06V 20/20 |
| 2018/0373859 A1* | 12/2018 | Ganong | G06F 21/36 |
| 2019/0050678 A1* | 2/2019 | Shen | G06V 40/161 |
| 2019/0294900 A1* | 9/2019 | Li | G06V 40/70 |
| 2019/0318159 A1* | 10/2019 | Blanc-Paques | G06Q 50/30 |

\* cited by examiner

*Primary Examiner* — Moeen Khan
(74) *Attorney, Agent, or Firm* — Jason C. Cameron (57) ABSTRACT

System and method to generate a unique security proof for secure accessing of data are disclosed. The method includes acquiring at least one image of a user's environment, analysing the at least one image for obtaining a first set of features, generating a unique security proof comprising a pair of keys, transmitting the unique security proof a key storage unit for storing the pair of keys, receiving at least one real-time image of the user's environment in real time, extracting a second set of features of the corresponding at least one real-time image, comparing the second set of features with the first set of features, determining one or more similarities between the second set of features and the first set of features, generating a confidence score, generating a notification for enabling the use of the pair of keys based on the confidence score generated for securely accessing of the data.

5 Claims, 6 Drawing Sheets

SYSTEM AND METHOD TO GENERATE A UNIQUE SECURITY PROOF FOR SECURE ACCESSING OF DATA

EARLIEST PRIORITY DATE

This Application claims priority from a complete patent application filed in India having Patent Application No. 202041018975, filed on May 4, 2020, and titled "SYSTEM AND METHOD TO GENERATE A UNIQUE SECURITY PROOF FOR SECURE ACCESSING OF DATA".

FIELD OF INVENTION

Embodiments of a present invention relate to generation of a security proof, and more particularly, to a system and method to generate a unique security proof for secure accessing of data.

BACKGROUND

Secure information system permits one or more users to gain access to information system based on verification of identity of the one or more users. The users need to prove their identity using credentials such as a username and a password. Authentication plays a major role in ensuring security of the information system by verifying the credentials provided by the one or more users and allowing one or more authorized users to gain access to the information system. Various authentication schemes such as authentication based on alphanumeric passwords, biometric passwords, graphical passwords and the like are available which are utilised by a system to authenticate the one or more users to access a plurality of online user accounts.

One such conventional system is available which includes a graphical authentication scheme to authenticate the one or more users to access the plurality of accounts. Such a conventional system requires an involvement of a user for selection of one or more point of interest regions in a picture to set as the graphical password and reproducing similar point of regions correctly in future for accessing the plurality of user accounts. However, such a conventional system requires remembering the point of regions of the picture selected by the user which is a tedious and a difficult task. Also, such a conventional system is unable to automatically recognise in real-time an environment or objects present in the environment. Moreover, such system is unable to relate a recognised object with a recognised place within the environment. Furthermore, such systems upon mapping identified object with the scene of the real-time environment generates erroneous results which reduces accuracy of the system.

Hence, there is a need for an improved system and method to generate a unique security proof for secure accessing of data to address the aforementioned issues.

BRIEF DESCRIPTION

In accordance with one embodiment of the disclosure, a system to generate a unique security proof for secure accessing of data is disclosed. The system includes one or more processors. The one or more processors includes an image acquisition module to acquire at least one image of a user's environment captured by an image capturing device. The one or more processors also includes an image analysis module to obtain a first set of features of the corresponding at least one image acquired by the image acquisition module. The one or more processors also includes a proof generation module to generate a unique security proof comprising a pair of keys based on at least one image analysed by the image analysis module. The unique security proof is associated to the user's environment. The unique security proof is generated to complete the verification process. The proof generation module is also configured to transmit the unique security proof comprising the pair of keys to a key storage unit to store the pair of keys generated. The one or more processor also includes an input receiving module configured to receive at least one real-time image of the user's environment captured by the image capturing device in real time. The one or more processors also includes a feature extraction module configured to extract a second set of features of the corresponding at least one real-time image acquired by the image acquisition module in real time. The at least one real-time image acquired by the image acquisition module is representative of the user's environment. The one or more processors also includes a feature comparison module configured to compare the second set of features extracted by the feature extraction module with the first set of features stored in the key storage database. The one or more processors also includes a confidence score generation module configured to determine one or more similarities between the second set of features and the first set of features. The confidence score generation module is also configured to generate a confidence score based on the one or more similarities determined. The one or more processors also includes an authentication module configured to generate a notification to enable the use of the pair of keys based on the confidence score generated by the confidence score generation module for securely accessing of the data. The confidence score generated is within a pre-defined range of score.

In accordance of another embodiment, a method for generating a unique security proof for secure accessing of data is disclosed. The method includes acquiring at least one image of a user's environment captured by an image capturing device. The method also includes analysing the at least one image representative of the user's environment for obtaining a first set of features of the corresponding at least one image acquired. The method also includes generating a unique security proof comprising a pair of keys based on at least one image analysed, wherein the unique security proof is associated to the user's environment. The method also includes transmitting the unique security proof comprising the pair of keys to a key storage unit for storing the pair of keys generated. The method also includes receiving at least one real-time image of the user's environment captured by an image capturing device in real time. The method also includes extracting a second set of features of the corresponding at least one real-time image acquired. The method also includes comparing the second set of features extracted with the first set of features stored in the key storage database. The method also includes determining one or more similarities between the second set of features and the first set of features. The method also includes generating a confidence score based on the one or more similarities determined. The method also includes generating a notification for enabling the use of the pair of keys based on the confidence score generated for securely accessing of the data. The confidence score generated is within a pre-defined range of score.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method to generate a unique security proof for secure accessing of data.

Figure 1:
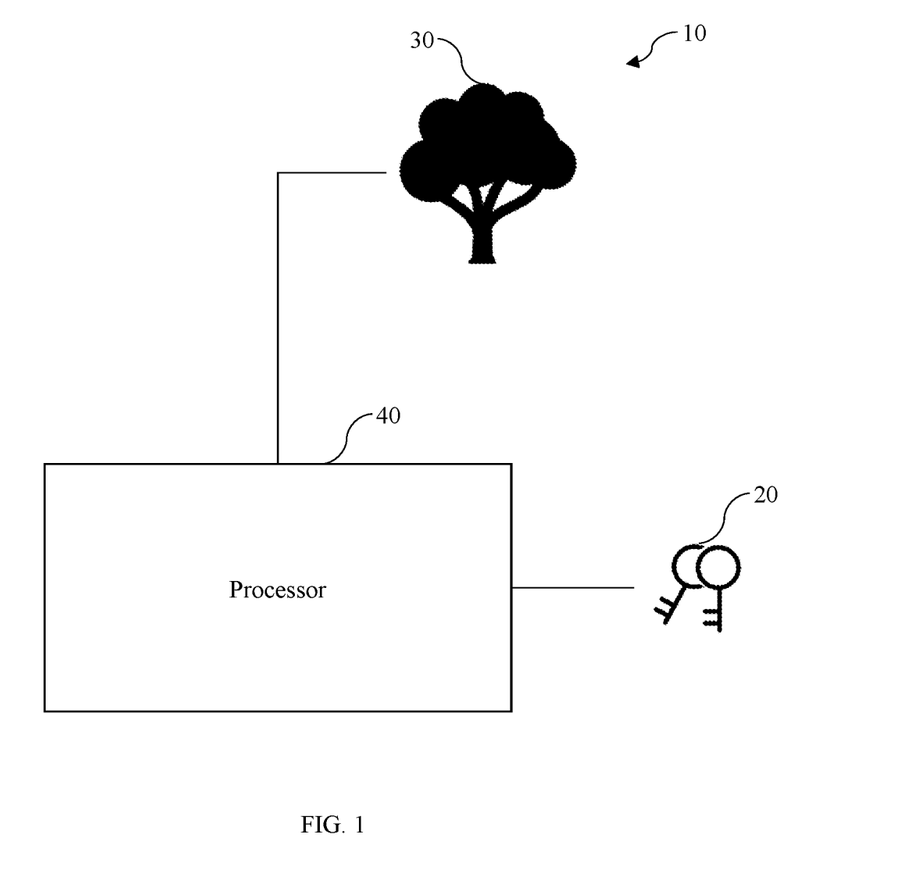
FIG. 1 is a block diagram representation of a system to generate a unique security proof for secure accessing of data in accordance with an embodiment of the present disclosure.

FIG. 1 is a block diagram representation of a system 10 to generate a unique security proof 20 generated through a user's environment 30 for secure accessing of data in accordance with an embodiment of the present disclosure. The system 10 includes one or more processors 40. As used herein, the term "security" is defined as a state of being free from danger or threat. Also, the term "security proof" also defined as "provable security" is defined as a type of security which can be proved. Further, "unique security proof" 20 may be defined as a security proof which may be unique to a specific authorised access.

Figure 2:
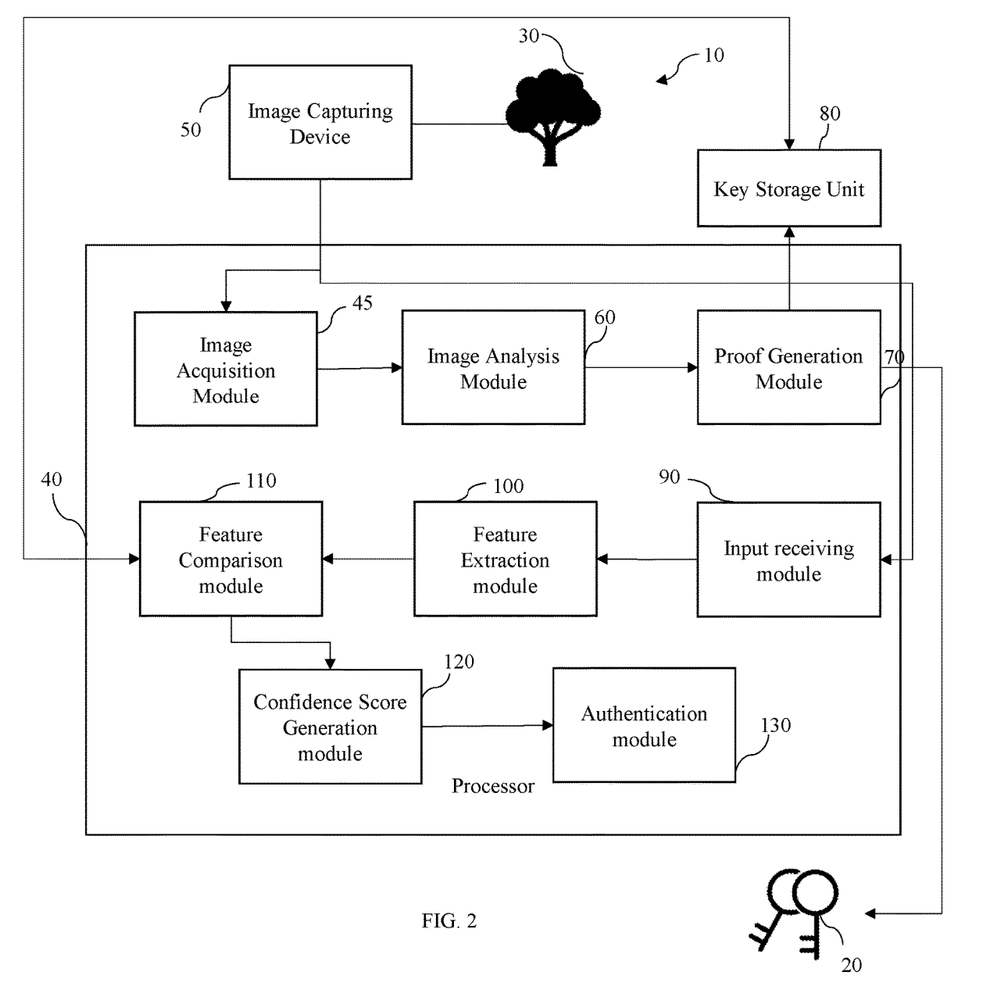
FIG. 2 is a block diagram of an exemplary embodiment representing one or more processors of the system of FIG. 1 in accordance with an embodiment of the present disclosure.

FIG. 2 is a block diagram of an exemplary embodiment representing one or more processors 40 of the system 10 of FIG. 1 in accordance with an embodiment of the present disclosure. The one or more processors 40 includes an image acquisition module 45 to acquire at least one image of a user's environment 30 captured by an image capturing device 50. As used herein, the term "user's environment" 30 may be defined as an environment or surrounding within which the user lives or operates.

In one embodiment, the image capturing device 50 may include one of a camera, one or more sensors, or the like, or a combination thereof. In such embodiment, the one or more sensors may include a light detection and ranging sensor (LIDAR). In such another embodiment, the camera may include a digital camera, a web camera, an infrared camera and the like. In one exemplary embodiment, the user's environment 30 may include one of a physical environment, a virtual environment or a combination thereof. In some embodiment, the two-dimensional representation may include the at least one image captured by the camera. In another embodiment, the three-dimensional point cloud representation of the user's environment 30 may include a three-dimensional map of the user's environment 30. In one exemplary embodiment, the virtual environment may be defined as computer generated environment or a computer-generated object which has no physical existence within the scene of the user's environment 30. In some embodiment, the input may be received from the user though a user's computing device associated with the user. In such embodiment, the computing device associated with the user may include at least one of a mobile phone, a tablet, a laptop, a desktop, a personal digital assistant (PDA) and the like.

In one embodiment, the image capturing device 50 may be integrated within a hand-held device or within a portable device of a user. In one embodiment, the hand-held device may be one of a mobile phone, a tablet and a laptop, wherein the image capturing device 50 associated with the hand-held device may be configured to capture the at least one image of the user's environment 30. In such embodiment, the at least one image captured by the image capturing device 50 may be transmitted to the image acquisition module 45.

Further, the one or more processors 40 includes an image analysis module 60 to analyse the at least one image representative of the user's environment 30 to obtain a first set of features of the corresponding at least one image acquired by the image acquisition module 45. In one embodiment, the user's environment may be a place or a surrounding which may be chosen by the user in accordance to the generation of the security proof for the verification process. In one exemplary embodiment, the first set of features may include at least one of an object, one or more properties associated with the object, a location, a relative location of the object and one or more properties associated with the user's environment 30 from the at least one image. In one exemplary embodiment, the first set of features of the corresponding at least one image associated with user's environment 30 may include a two-dimensional representation, a three-dimensional point cloud representation of the environment, or a combination thereof. In such embodiment, the set of environmental data includes a first set of environmental data which is received at a first instant of time. As used herein, the term 'first set of environmental data' is defined as the environmental data which may be received from the one or more sensors during registration process by a user, for setting a password to create a representation and to securely access the data.

In one exemplary embodiment, the first set of features may be defined as features of the environment corresponding to the 3D point cloud data or the 2D image which is received at the first time instant. In one embodiment, the first set of features corresponding to the 3D point cloud data may include one or more three dimensional coordinates of the one or more objects present in the environment. In another embodiment, the first set of unique features corresponding to the 2D image may include one or more parameters of the image of the environment.

In one exemplary embodiment, the first set of features from the at least one image associated with the user's environment 30 may be extracted using an artificial intelligence technique. As used herein, the term 'artificial intelligence' is defined as an intelligence demonstrated by a machine which is in contrast with the human intelligence. Further, the artificial intelligence technique may be enabled by the image analysis module 60 to extract the first set of features accurately from the at least one image representative of the user's environment 30.

In one specific embodiment, the first set of features may be extracted using a computer vision technique. As used herein, the term 'computer vision technique' is defined as a technique which automatically analyses and understands information from a digital image which involves automatic visual understanding. In one embodiment, the computer vision technique may be a convolutional neural network (CNN) method. As used herein, the term 'convolutional neural network method' is defined as a type of technique applied on the digital image for analysing the same.

The one or more processors 40 also includes a proof generation module 70 to generate a unique security proof 20 comprising a pair of keys based on at least one image analysed by the image analysis module 60. The unique security proof 20 is associated to the user's environment 30. As used herein, the term 'asymmetric keys' is defined as keys which are asymmetric to each other which is used for encryption and decryption of data. The unique security proof 20 is generated to complete the verification process. In one embodiment, the pair of keys may include one of a pair of symmetric keys or a pair of asymmetric keys. In such embodiment, the pair of asymmetric keys may include a public key and a private key.

Furthermore, the unique security proof 20 is associated to the user's environment 30, wherein the unique security proof 20 is generated to complete the verification process. More specifically, the proof generation module 70 generates the pair of keys based on the first set of features extracted by the corresponding at least one image. Further, the user utilises the pair of keys as the unique security proof 20 to complete the verification process associated with any kind of authentication to access the data.

In one exemplary embodiment, the one or more processors 40 may further include a user key generation module to receive a unique input from the user. The unique input may be synced with the unique security proof 20, and the verification process is completed using the unique input and the unique security proof 20. In such embodiment, the unique input may correspond to at least one of a biometric data associated with the user, a security code such as a personal identification number (PIN) generated by the user, a pattern generated by the user through an interface of the hand-held device and the like. In one embodiment, the biometric data may correspond to one of user's face, user's fingerprint, user's iris, user's voice and the like. Further, the unique input from the user may also be utilised to complete the verification process by the user along with the unique security proof 20 to securely access the data.

The proof generation module 70 is also configured to transmit the unique security proof 20 comprising the pair of keys to a key storage unit 80 to store the pair of keys generated. Referring above, in one embodiment, if the pair of keys corresponds to the pair of asymmetric keys, the private key may be stored in the key storage unit 80. In another embodiment, if the pair of keys corresponds to the pair of symmetric keys, one at least one of the pair of symmetric keys may be stored in the key storage unit. In such embodiment, the key storage unit 80 may correspond to a database.

In one embodiment, the key storage unit 80 may store a first representation of the first set of features of the user's environment 30 extracted from the first set of features. As used herein, the term 'first representation' is defined as a presentation or a depiction of the at least one image of the user's environment 30 at the first instant of time. In one embodiment, the first representation of the first set of features may include the three-dimensional map of the environment in x-y-z coordinates when the first set of environmental data is 3D point cloud data. In another embodiment, the first representation of the first set of features may include a representation of the user's environment 30 in a form of an image when the first set of features includes the 2D image The key storage unit 80 may also stores a processed version of the first set of features of the 3D or the 2D data with or without the original 3D/2D data being stored.

In one exemplary embodiment, the proof generation module 70 may generate a new pair of unique keys associated with the user input which may be used by the user for the varication process in addition to the pair of keys associated with the user's environment 30 to form two layers of security for the varication process to securely access the data.

Furthermore, the above described steps and process may be done for a single time in order to set up the authentication to securely access the data from one or more resources. Once the unique security proof 20 is setup, the access to the one or more resources multiple times can be done through the process as described below. In one embodiment, the one or more resources may include one of an account which may be associated to an organisation such as bank, a social media platform, or the like. In another embodiment, the one or more resources may include an access to one or more locations such as access to the computing device, access to a building, or the like. In yet another embodiment, the one or more resources may include at least one of, an online shopping account associated with the user, an online travel organisation account associated with the user or a combination thereof.

In light of the above, the one or more processors 40 further includes an input receiving module 90 to receive at least one real-time image of the user's environment 30 captured by the image capturing device 50 in real time. More specifically, the at least one real image is acquired by the user when the user may access the data anytime upon being authenticated. In one embodiment, the real time may refer to a second instant of time. The at least one real time image may be captured using one of the one or more sensors, the image capturing device 50 or the like.

Furthermore, the one or more processors 40 includes a feature extraction module 100 to extract a second set of features of the corresponding at least one real-time image acquired by the image acquisition module 45 in real time. The at least one real-time image acquired by the image acquisition module 45 is representative of the user's environment 30. In one embodiment, the second set of features of the corresponding at least one real-time image associated with user's environment obtained may include at least one of an object, one or more properties associated with the object, a location, a relative location of the object and one or more properties associated with the user's environment 30 from the at least one real-time image. In one exemplary embodiment, the second set of features of the corresponding at least one real-time image acquired in real time may include a two-dimensional representation, a three-dimensional point cloud representation of the user's environment 30 or a combination thereof.

The one or more processors 40 also includes a feature comparison module 110 to compare the second set of features extracted by the feature extraction module 100 with the first set of features stored in the key storage database. In one embodiment, the second set of features is compared with the first set of features using vision memory. In one embodiment, the first set of features may include stored features corresponding to the first set of features. In another embodiment, the second set of features may include new features extracted from the second set of features, wherein the new features may include at least one of new point clouds or new parameters of the at least one real image of the user's environment 30.

The one or more processors 40 also includes a confidence score generation module 120 to determine one or more similarities between the second set of features and the first set of features. In one embodiment, the one or more similarities between the second set of features and the first representation of the first set of unique features may be determined. In one exemplary embodiment, in case of the three-dimensional point cloud data, the one or more similarities may be determined between the second set of features and the first set of features based on computation of a distance between the one or more objects present in the at least one real-image associated with the user's environment 30 by using one or more distance computation techniques.

Similarly, in another embodiment, in case of the 2D image, the one or more similarities between the second set of features and the first set of features may be determined based on the vision memory. As used herein, the term 'vision memory' is defined as a relationship between perceptual processing and the encoding, storage and retrieval of the resulting neural representations. In one embodiment, the vision memory may be implemented using a convolutional neural network (CNN) model.

Furthermore, the confidence score generation module 120 is also configured to generate a confidence score based on the one or more similarities determined. The one or more processors 40 also includes an authentication module 130 to generate a notification to enable the use of the pair of keys based on the confidence score generated by the confidence score generation module 120 for securely accessing of the data. The confidence score generated is within a pre-defined range of score. In one embodiment, the pre-defined range of score may be about 95-100%.

In one exemplary embodiment, the confidence score generation module 120 may be configured to generate an access deny notification when the computed confidence score forfeits from the pre-defined range of score of the confidence score.

Figure 3:
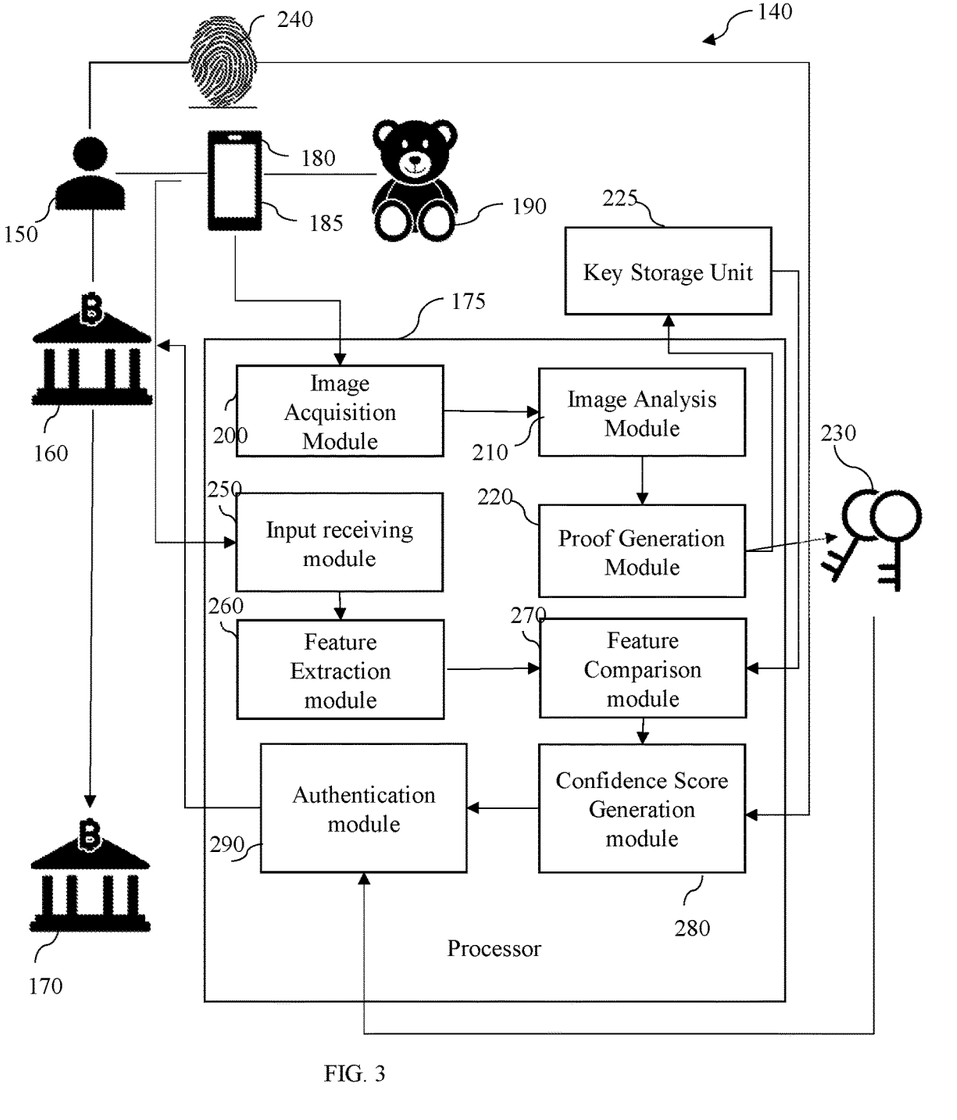
FIG. 3 is another exemplary embodiment of a system to generate a unique security proof for a monitory transaction of FIG. 1 in accordance with an embodiment of the present disclosure.

FIG. 3 is another exemplary embodiment of a system 140 to generate a unique security proof 230 for a monitory transaction of FIG. 1 in accordance with an embodiment of the present disclosure.

The system 140 enables a user X in securely accessing an online user account by creating a unique representation of a user's environment 30. Considering an example, where the user having a multiple online user accounts with corresponding multiple credentials. Now, if the user forgets the corresponding multiple credentials, then the user may not be able to access the multiple accounts. In such a scenario, a unique sign, an evidence or a feature needs to be recollected or reproduced through which the multiple accounts may be accessed by the user. The system 140 in such a scenario helps in creating the unique representation of the user's environment 30, creating a pair of keys to access the multiple accounts and determines similarities between the unique features of the user's environment 30 based on which the user may be enabled to access the multiple accounts.

For example, the user X 150 in one scenario, wants to make the monitory transaction from an account A 160 to an account B 170 upon completing a verification process at a gateway. In order to access one of the user account, the user X 150 sets a password associated with unique representation of the environment 190 of his or her room. Then in such a scenario, for creation of the unique representation, at a first instant of time during the registration process, the user X 150 through a camera 180 of a mobile phone 185 captures an image of a teddy bear 190 in order to keep the teddy bear 190 as a code to generate the unique security proof 230 for completing the verification process.

The image captured by the camera 180 is now acquired by an image acquisition module 200 of a processor 175. Further, the image representative of the teddy bear 190 acquired is analysed and a corresponding first set of features of the teddy bear 190 is obtained using a computer vision technique by an image analysis module 210. further, based on the first set of features obtained, a unique security proof 230 in a form of a private key and a public key is generated by a proof generation module 220. Also, the public key and the private key is transmitted and stored in a key storage unit 225.

Simultaneously, fingerprint of the user X 150 is obtained by a user key generation module upon scanning the fingerprint 240 by a scanning device. Furthermore, the unique security proof 230 and the fingerprint 240 is submitted by the user X 150 to authenticate the monetary transaction by an authentication module 290. Upon completing the authentication successfully, the user X 150 can transact a desired amount of money from the account A 160 to the account B 170.

Moreover, the user X 110 desires to make a second transaction from the account A 160 to the account B 170, in such a situation, the user X 150 captures the image of the teddy bear 190 at a second instant of time using the camera 180 and is transmitted to an input receiving module 250. On receiving the image of the teddy bear 190 at the second instant of time, a second set of features of the teddy bear 190 is extracted by a feature extraction module 260. Further on extracting the second set of features, the same is compared with the first set of features by a feature comparison module 270.

On obtaining a comparison result, one or more similarities between the first of features and the second set of features are determined by a confidence score generation module 280. Further, the confidence score generation module 280 generates a confidence score based on the one or more similarities determined between the image of the teddy bear 190 obtained in the first instant of time and the image of the teddy bear 190 obtained at the second instant of time. In one scenario, the confidence score is found to be 95%. Upon having such a confidence score, an authentication module 290 will generate a notification to enable the use of the pair of keys stored in the key storage unit 225 based on the confidence score. As a result, the user X 150 can successfully make the second transaction from the account A 160 to the account B 170.

Furthermore, the image acquisition module 200, the image analysis module 210, the camera 180, the proof generation module 220, the input receiving module 250, the feature extraction module 260, the feature comparison module 270, the confidence score generation module 280 and the authentication module 290 are substantially similar to an image acquisition module 45, an image analysis module 60, a proof generation module 70, an input receiving module 90, a feature extraction module 100, a feature comparison module 110, a confidence score generation module 120 and an authentication module 130 of FIG. 1.

Figure 4:
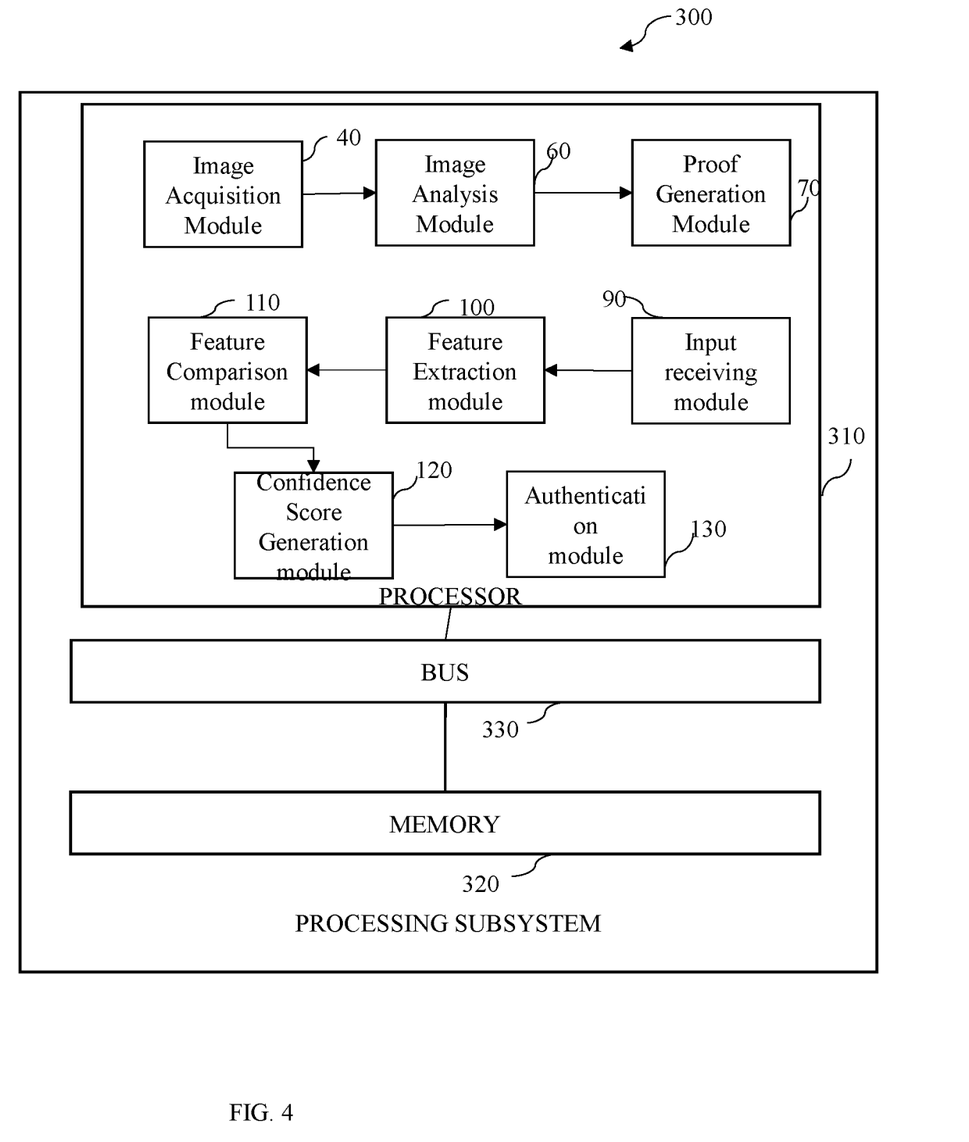
FIG. 4 is a block diagram representation of a processing subsystem located on a local server or on a remote server in accordance with an embodiment of the present disclosure.

FIG. 4 is a block diagram representation of a processing subsystem located on a local server or on a remote server in accordance with an embodiment of the present disclosure. The server 300 includes processors 310, and memory 320 operatively coupled to the bus 330.

The processor(s) 310, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 5A:
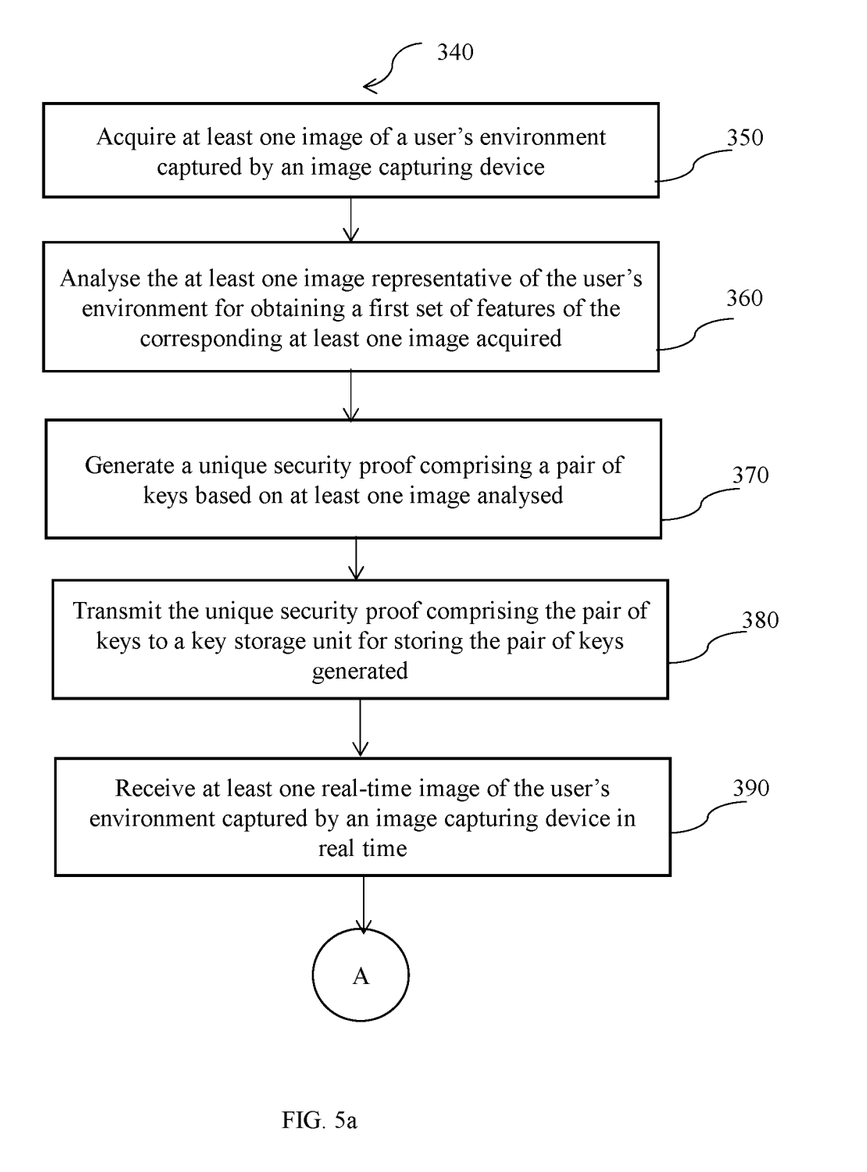
FIG. 5a and FIG. 5b are flow charts representing steps involved in a method for generating a unique security proof for secure accessing of data in accordance with an embodiment of the present disclosure.
Figure 5B:
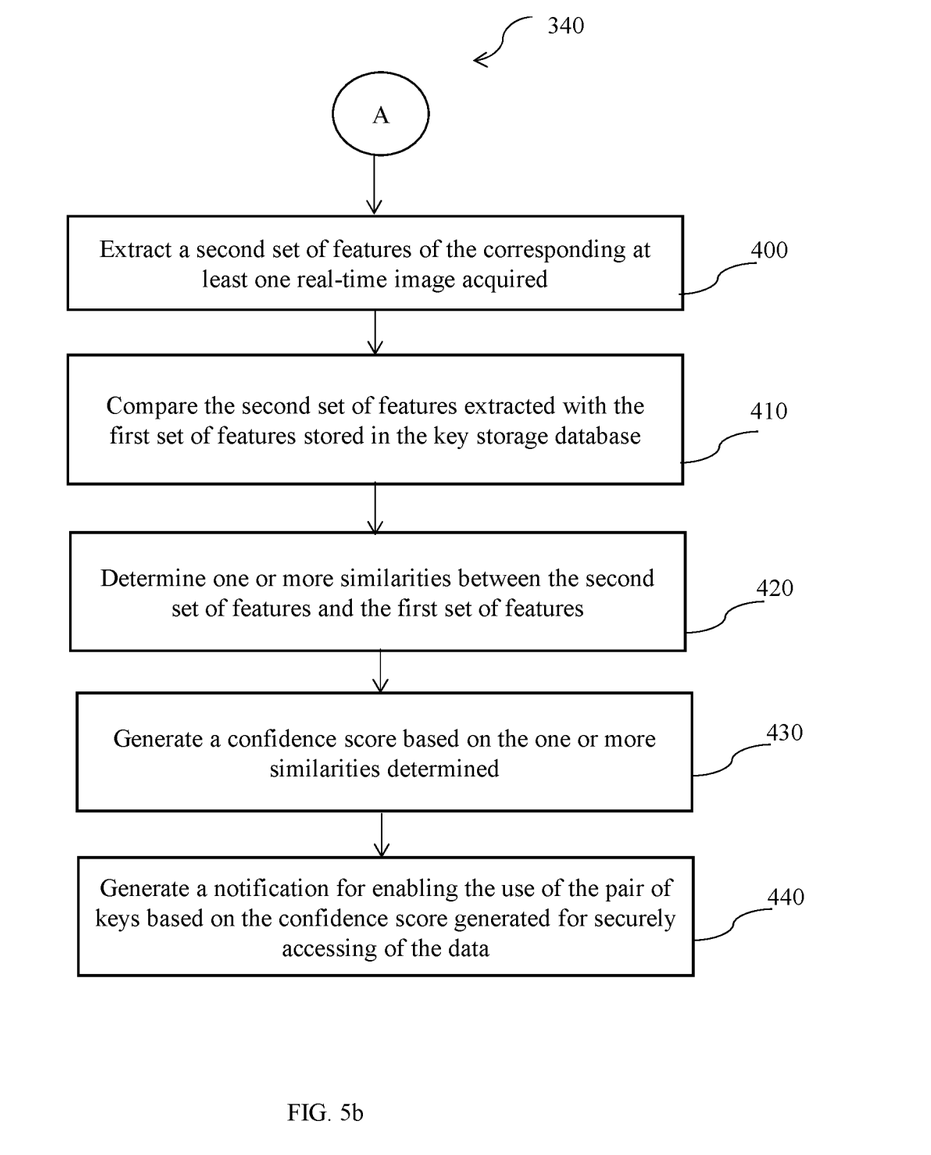

The memory 320 includes a plurality of modules stored in the form of executable program which instructs the processor 310 to perform the method steps illustrated in FIGS. 5a and 5b. The memory 320 is substantially similar to the system 10 of FIG. 1. The memory 320 has modules: an image acquisition module 45, an image analysis module 60, a proof generation module 70, an input receiving module 90, a feature extraction module 100, a feature comparison module 110, a confidence score generation module 120 and an authentication module 130.

The image acquisition module 45 configured to acquire at least one image of a user's environment captured by an image capturing device 50. The image analysis module 60 configured to analyse the at least one image representative of the user's environment to obtain a first set of features of the corresponding at least one image acquired by the image acquisition module 45. The proof generation module 70 configured to generate a unique security proof comprising a pair of keys based on at least one image analysed by the image analysis module 60 and to transmit the unique security proof comprising the pair of keys to a key storage unit to store the pair of keys generated.

The input receiving module 90 configured to receive at least one real-time image of the user's environment captured by the image capturing device in real time. The feature extraction module 100 configured to extract a second set of features of the corresponding at least one real-time image acquired by the image acquisition module 45 in real time. The feature comparison module 110 configured to compare the second set of features extracted by the feature extraction module 100 with the first set of features stored in the key storage database. The confidence score generation module 120 configured to determine one or more similarities between the second set of features and the first set of features and to generate a confidence score based on the one or more similarities determined. The authentication module 130 configured to generate a notification to enable the use of the pair of keys based on the confidence score generated by the confidence score generation module 120 for securely accessing of the data.

FIG. 5a and FIG. 5b are flow charts representing steps involved in a method 340 for generating a unique security proof for secure accessing of data in accordance with an embodiment of the present disclosure. The method 340 includes acquiring at least one image of a user's environment captured by an image capturing device in step 350. In one embodiment, acquiring the at least one image may include at least one image by an image acquisition module. In one exemplary embodiment, acquiring the at least one image from the user's environment captured by the image capturing device may include acquiring the at least one image user's environment by one or more sensors, one or more cameras or the like. In such embodiment, the one or more camera may include one of a digital camera, a web camera, an infrared camera and the like which may be integrated within a hand-held device. In another embodiment, the one or more sensors may include a light detection and ranging sensor (LIDAR).

In one exemplary embodiment, acquiring the at least one image of the user's environment may include acquiring the at least one image from one of a physical environment, a virtual environment or a combination thereof.

The method 340 also includes analysing the at least one image representative of the user's environment for obtaining a first set of features of the corresponding at least one image acquired in step 360. In one embodiment, analysing the at least one image may include analysing the at least one image by an image analysing module. In one exemplary embodiment, analysing the at least one image may include analysing the at least one image by using a computer vision technique. In one specific embodiment, analysing the at least one image by using a computer vision technique may include analysing the at least one image by using a convolutional neural network (CNN) method. In one exemplary embodiment, analysing the at least one image representative of the user's environment may include analysing the at least one image by using an artificial intelligence technique.

In one embodiment, obtaining the first set of features may include obtaining at least one of an object, one or more properties associated with the object, a location, a relative location of the object and one or more properties associated with the user's environment from the at least one image.

Furthermore, the method 340 includes generating a unique security proof comprising a pair of keys based on at least one image analysed, wherein the unique security proof is associated to the user's environment in step 370. In one embodiment, generating the unique security proof comprising the pair of keys may include generating the unique security proof by a proof generation module. In one exemplary embodiment, generating the unique security proof comprising the pair of keys may include generating the unique security proof comprising one of a pair of symmetric keys or a pair of asymmetric keys.

In one exemplary embodiment, the method 340 may further include receiving a unique input from a user. Further, the method 340 may include syncing the unique input with the unique security proof and completing the verification process upon using the unique input and the unique security proof. In such embodiment, receiving the unique input may include receiving the unique input by a user key generation module. In one embodiment, receiving at least one of a biometric date associated with the user, a security code such as a personal identification number (PIN) generated by the user, a pattern generated by the user through an interface of the hand-held device and the like. In such embodiment, receiving the at least one of a biometric date associated with the user may include receiving biometric data associated with one of user's face, user's fingerprint, user's iris, user's voice and the like.

Furthermore, the method 340 includes transmitting the unique security proof comprising the pair of keys to a key storage unit for storing the pair of keys generated in step 380. In one embodiment, transmitting the unique security proof may include transmitting the unique security proof by the proof generation module. In one exemplary embodiment, transmitting the unique security proof may include transmitting the unique security proof to a database.

The method 340 also includes receiving at least one real-time image of the user's environment captured by an image capturing device in real time in step 390. In one embodiment, receiving the at least one real-time image comprises receiving the at least one real-time image by an input receiving module. In such embodiment, receiving the at least one real-time image comprises receiving the at least one real-time image captured by one or more sensors, one or more cameras or the like.

The method 340 also includes extracting a second set of features of the corresponding at least one real-time image acquired in step 400. In one embodiment, extracting the second set of features may include extracting the second set of features by a feature extraction module. In one embodiment, extracting the second set of features of the corresponding at least one real-time image acquired in real time may include extracting at least one of an object, one or more properties associated with the object, a location, a relative location of the object and one or more properties associated with the user's environment from the at least one real-time image.

Furthermore, the method 340 includes comparing the second set of features extracted with the first set of features stored in the key storage database in step 410. In one embodiment, comparing the second set of features with the first set of features may include comparing the second set of features with the first set of features using a feature comparison module. The method 340 also includes determining one or more similarities between the second set of features and the first set of features in step 420. In one embodiment, determining the one or more similarities may include determining the one or more similarities using a confidence score generation module. In one exemplary embodiment, comparing the second set of features extracted with the first set of features stored in the key storage database may include comparing the second set of features with the first set of features using vision memory.

The method 340 also includes generating a confidence score based on the one or more similarities determined in step 430. In one embodiment, generating the confidence score may include generating the confidence score by the confidence score generation module. The method 340 also includes generating a notification for enabling the use of the pair of keys based on the confidence score generated for securely accessing of the data in step 440. The confidence score generated is within a pre-defined range of score. In one embodiment, generating the notification may include generating the notification by an authentication module.

Various embodiments of the present disclosure enable the system and method to generate a unique security proof associated with a user's environment enable the system to complete the verification process using the unique security proof. Also, creation of the unique representation of the environment based on the 3D point cloud data and the 2D image of environment. Moreover, the system captures the scene of the user's environment by considering the at least one object present across the same, and considering the error in measurement, error in size of each object and still approximately computing the confidence score to check if a same environment is represented at the second instant of time to enable the secured access of the data.

Furthermore, the system based on recognition of the at least one object present within the user's environment and by creating the unique representation of the user's environment generates a master password which further helps the user in accessing the plurality of accounts associated with the user without remembering. In addition, as the verification process is also synced with the unique input of the user, an additional encryption layer is created to make the system more secure.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A computer implemented system to generate a unique security proof for secure accessing of data comprising:
   one or more processors; and
      a memory operatively coupled to a bus that couples the memory to the one or more processors, wherein the memory includes a plurality of modules stored in the form of executable program which instructs the one or more processors, wherein the plurality of modules comprise:
   an image acquisition module configured to acquire at least one image of a user's environment captured by an image capturing device, wherein the user's environment is at least one of a fixed place and a fixed surrounding, chosen by a user, and wherein the user's environment comprises one of a physical environment and a virtual environment;
   an image analysis module configured to analyze the at least one image representative of the user's environment to obtain a first set of features of the corresponding at least one image acquired by the image acquisition module, wherein the first set of features of the corresponding at least one image associated with user's environment comprises a three-dimensional point cloud representation of the user's environment, wherein the three-dimensional point cloud representation of the user's environment comprises a three-dimensional map of the user's environment and wherein the three-dimensional point cloud representation of the user's environment is associated with at least one of: an object, one or more properties associated with the object, a location, and a relative location of the object and one or more properties associated with the user's environment from the at least one image, and is associated with exclusion of the user;
   a proof generation module configured to:
      generate a unique security proof comprising a pair of keys based on the at least one image analyzed by the image analysis module, wherein the unique security proof is associated to the user's environment; and
      transmit the unique security proof comprising the pair of keys to a key storage unit to store the pair of keys generated;
   a user key generation module configured to:
      receive a unique input from the user, wherein the unique input is synced with the unique security proof; and
      complete verification process using the unique input and the unique security proof;
   an input receiving module configured to receive at least one real-time image of the user's environment captured by the image capturing device in real time, wherein the image capturing device comprises at least one of: a camera and one or more sensors, and wherein the one or more sensors comprise a light detection and ranging (LIDAR) sensor;
   a feature extraction module configured to extract a second set of features of the corresponding at least one real-time image acquired by the input receiving module in real time, wherein the at least one real-time image acquired by the input receiving module is representative of the user's environment, wherein the second set of features of the corresponding at least one real-time image acquired in real time comprises a three-dimensional point cloud representation of the user's environment, and wherein the three-dimensional point cloud representation of the user's environment is associated with at least one of: an object, one or more properties associated with the object, a location, and a relative location of the object and one or more properties associated with the user's environment from the at least one real-time image, and is associated with exclusion of the user;
   a feature comparison module configured to compare the second set of features extracted by the feature extraction module with the first set of features stored in the key storage database, wherein the second set of features is compared with the first set of features using vision memory;
   a confidence score generation module configured to:
      determine one or more similarities between the second set of features and the first set of features; and
      generate a confidence score based on the one or more similarities determined; and
   an authentication module configured to generate a notification to enable the use of the pair of keys based on the confidence score generated by the confidence score generation module for securely accessing of the data, wherein the confidence score generated is within a pre-defined range of score.

2. The computer implemented system as claimed in claim 1, wherein the pair of keys comprises one of a pair of symmetric keys or a pair of asymmetric keys.

3. The computer implemented system as claimed in claim 1, wherein the second set of features of the corresponding at least one real-time image acquired in real time comprises a two-dimensional representation of the user's environment.

4. A method for generating a unique security proof for secure accessing of data comprising:
   acquiring, by an image acquisition module, at least one image of a user's environment captured by an image capturing device, wherein the user's environment is at least one of a fixed place and a fixed surrounding, chosen by a user, and wherein the user's environment comprises one of a physical environment and a virtual environment;
   analyzing, by an image analysis module, the at least one image representative of the user's environment for obtaining a first set of features of the corresponding at least one image acquired, wherein the first set of features of the corresponding at least one image associated with user's environment comprises a three-dimensional point cloud representation of the user's environment, wherein the three-dimensional point cloud representation of the user's environment comprises a three-dimensional map of the user's environment and wherein the three-dimensional point cloud representation of the user's environment is associated with at least one of: an object, one or more properties associated with the object, a location, and a relative location of the object and one or more properties associated with the user's environment from the at least one image, and is associated with exclusion of the user;
   generating, by a proof generation module, a unique security proof comprising a pair of keys based on the at least one image analyzed, wherein the unique security proof is associated to the user's environment;
   transmitting, by the proof generation module, the unique security proof comprising the pair of keys to a key storage unit for storing the pair of keys generated;
   receiving, by a user key generation module, a unique input from the user;

syncing, by the user key generation module, the unique input with the unique security proof;
completing, by the user key generation module, verification process using the unique input and the unique security proof;
receiving, by an input receiving module, at least one real-time image of the user's environment captured by an image capturing device in real time, wherein the image capturing device comprises at least one of: a camera and one or more sensors, and wherein the one or more sensors comprise a light detection and ranging (LIDAR) sensor;
extracting, by a feature extraction module, a second set of features of the corresponding at least one real-time image acquired in real time, wherein the second set of features of the corresponding at least one real-time image acquired in real time comprises a three-dimensional point cloud representation of the user's environment, and wherein the three-dimensional point cloud representation of the user's environment is associated with at least one of: an object, one or more properties associated with the object, a location, and a relative location of the object and one or more properties associated with the user's environment from the at least one real-time image, and is associated with exclusion of the user;
comparing, by a feature comparison module, the second set of features extracted with the first set of features stored in the key storage database, wherein the second set of features is compared with the first set of features using vision memory;
determining, by a confidence score generation module, one or more similarities between the second set of features and the first set of features;
generating, by the confidence score generation module, a confidence score based on the one or more similarities determined; and
generating, by an authentication module, a notification for enabling the use of the pair of keys based on the confidence score generated for securely accessing of the data, wherein the confidence score generated is within a pre-defined range of score.

5. The method as claimed in claim 4, wherein generating the unique security proof comprising the pair of keys comprises generating the unique security proof comprising one of a pair of symmetric keys or a pair of asymmetric keys.

* * * * *